C. W. LEVALLEY.
TRANSMISSION GEARING.
APPLICATION FILED JULY 14, 1915.
1,194,300.
Patented Aug. 8, 1916.
2 SHEETS—SHEET 2.
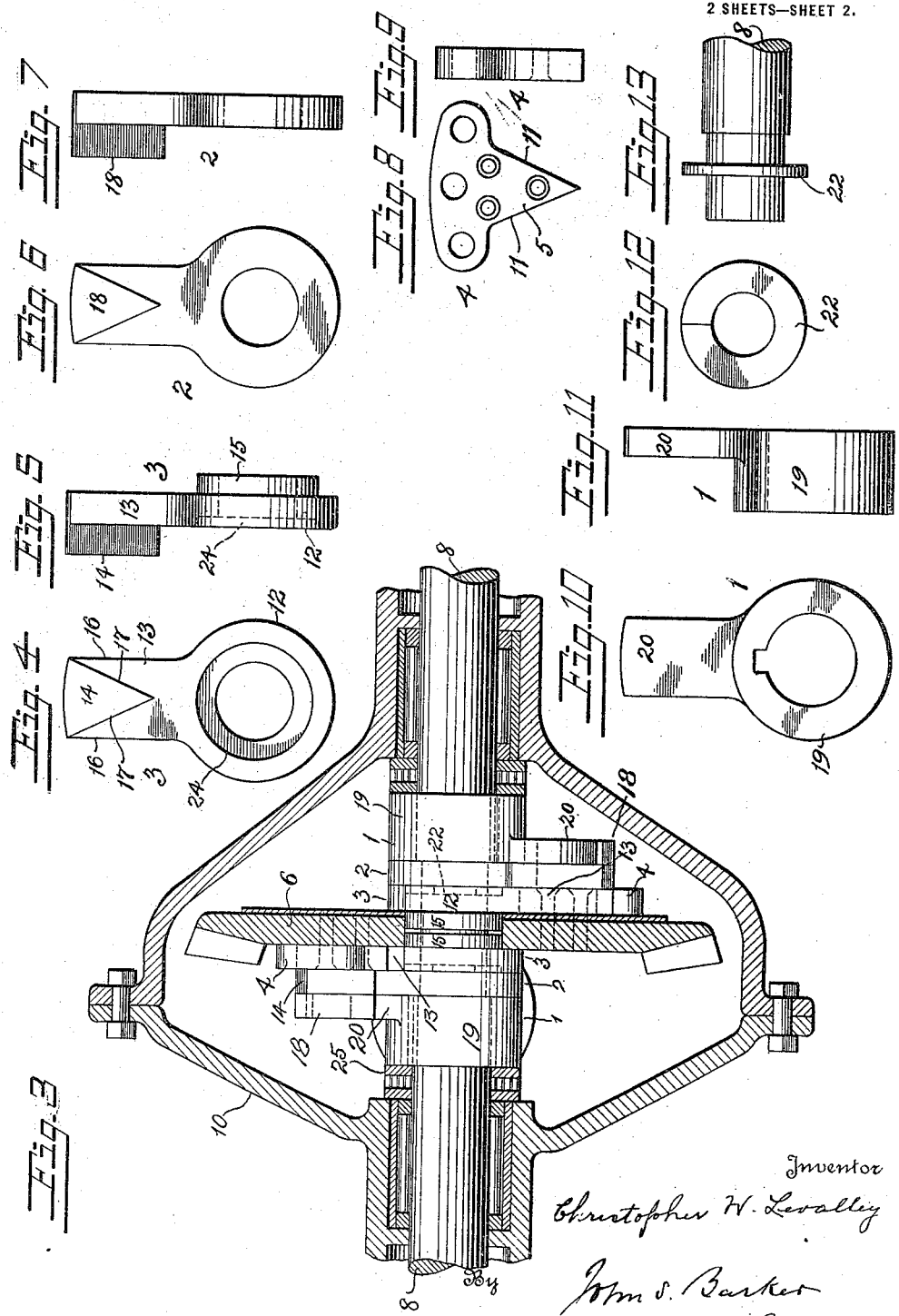
Inventor
Christopher W. Levalley
By John S. Barker
his Attorney

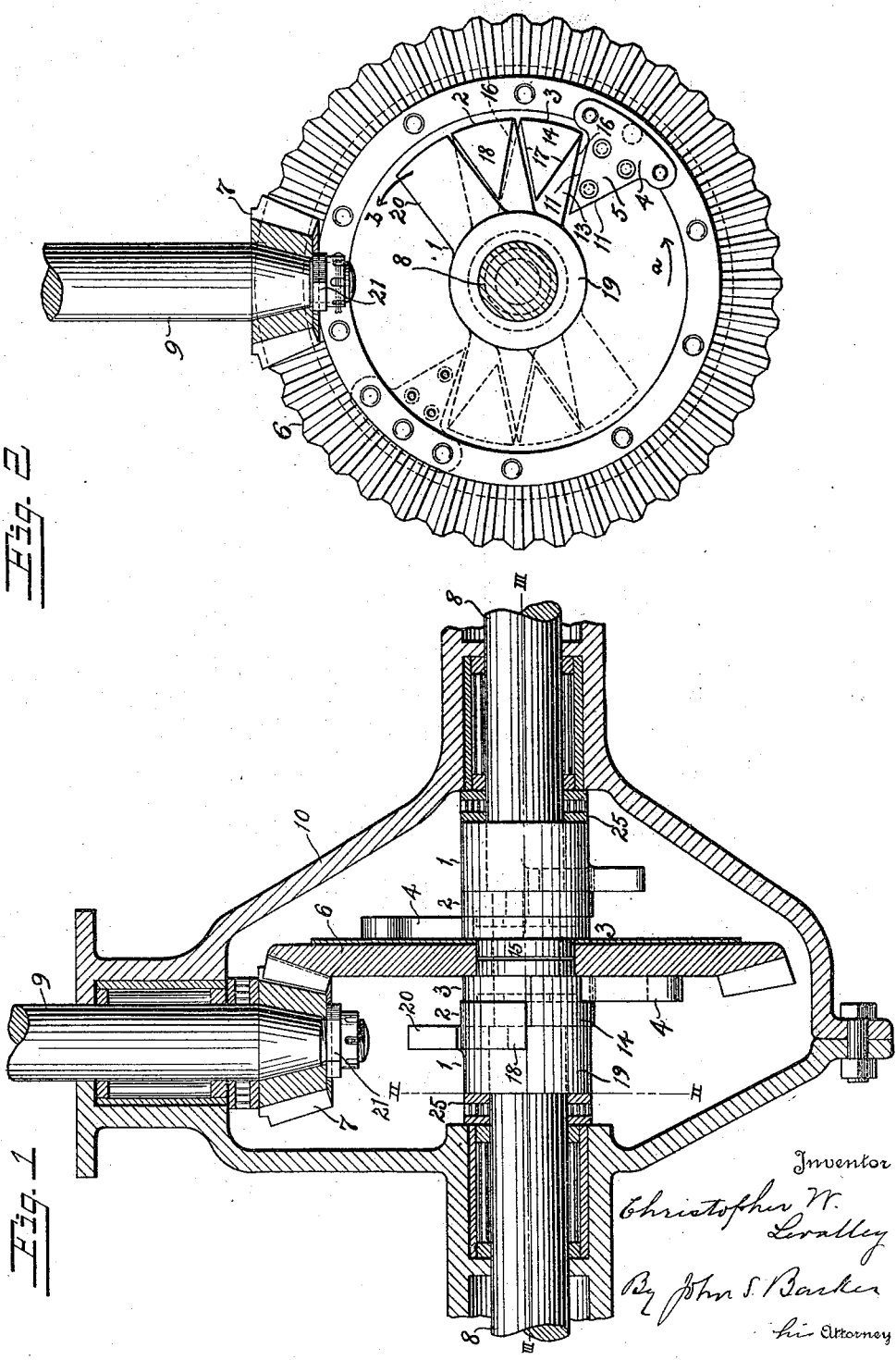

UNITED STATES PATENT OFFICE.

CHRISTOPHER W. LEVALLEY, OF MILWAUKEE, WISCONSIN.

TRANSMISSION-GEARING.

1,194,300. Specification of Letters Patent. Patented Aug. 8, 1916.

Application filed July 14, 1915. Serial No. 39,844.

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Transmission-Gearing, of which the following is a specification.

My invention relates to that class of transmission gearing which is intended to be interposed between a driving and a driven member, and particularly between a driving gear and a divided shaft where provision is made for simultaneously driving both sections of the shaft when the two revolve in unison; but, when one turns faster than the other, then driving only the more slowly turning section, the other one running free. Mechanisms of this kind, broadly considered, are well known in the art, and have been applied to motor vehicles.

My present invention has for its object to simplify and improve gearing of this kind.

In the accompanying drawings—Figure 1 is a horizontal sectional view of a transmission gearing embodying my invention and adapted to be used as part of the driving mechanism of a light motor vehicle. Fig. 2 is a transverse sectional view taken on the line II—II of Fig. 1. Fig. 3 is a central transverse sectional view taken lengthwise of the driven shaft, on the line III—III of Fig. 1. Figs. 4 and 5 illustrate in side elevation and edge view, respectively, the floating coupling member 3. Figs. 6 and 7 illustrate in side elevation and edge view, respectively, the floating member 2. Figs. 8 and 9 illustrate in elevation and edge view, respectively, the driving piece 4 that is secured to the main drive gear. Figs. 10 and 11 illustrate in elevation and edge view, respectively, the coupling member 1 that is secured to the driven shaft. Fig. 12 is an elevation of the split retaining washer 22 detached; and Fig. 13 is a detached view illustrating said washer in position upon the shaft to which it is applied.

In the drawings, 8, 8 indicate the sections of a divided driven shaft such as the rear axle of a motor vehicle. The inner ends of these shaft sections are represented as being brought close together end to end, the sections being in alinement, and as entering a suitable casing 10 that serves to close in and protect the transmission gearing, and, if desired, to constitute a lubricant chamber.

9 indicates the motor driven shaft suitably supported in the casing and carrying at its inner end a gear, here represented as a bevel pinion 7, that meshes with a bevel wheel 6 loosely supported upon the driven shaft and connected respectively with the sections thereof through coupling or clutch devices in which are embodied the novel features of this invention. The bevel pinion 7 is held in place on the shaft 9 by a retaining nut 21 that is provided with suitable locking means. The coupling connections between the main drive gear 6 and the two sections of the driven shaft are similar. I will describe in detail but one of them.

4 designates a driving piece secured to the face of the drive gear 6. The essential and characteristic part of this driving piece is a projection 5 that is offset from the face of the drive gear and is preferably of wedge shape. The edges of the projection 5 constitute opposite driving faces and are designated 11, 11.

3 indicates a floating coupling member supported upon the driven shaft and located adjacent to the driving piece 4 so as to be engaged thereby. This floating coupling member consists preferably of a hub 12, an arm 13 extending therefrom, and a projection 14 extending laterally from the arm. The hub 12 fits loosely upon the driven shaft so that it is free to turn relative thereto in either direction. It is formed with a reduced portion 15 that extends inward toward the main drive gear 6 and, together with a like reduced portion of the hub of the corresponding floating member on the opposite side of such gear, constitutes the bearing for the gear 6. The face of the hub opposite the reduced portion 15 is recessed, as indicated at 24, and into this recess is fitted a split retaining annular washer 22, the inner edge of which is seated in a groove formed in the shaft 8. This arrangement is employed to hold the axle in place longitudinally. The opposite faces 16 of the arm 13 of the floating member 3 lie in such planes and are finished at such an angle as to be engaged by the faces 11 of the wedge shaped projection of the driving piece 4; while the opposite edges of the projection 14, which is preferably wedge shaped, constitute driving faces 17.

2 designates another floating coupling member supported loosely upon the driven shaft just outside,—that is, away from the main drive gear 6—, of the floating coupling member 3 already described. These two floating coupling members, 2 and 3, are similar in construction except that the one designated 2 is not provided with a reduced hub portion 15, nor is it connected with the shaft on which it is supported by a retaining washer. It has an arm extending outward from its hub portion, and this latter carries a lateral wedge-shaped projection 18. The driving faces 17 of the lateral projection of the floating member 3 engage with the edges of the arm of the floating member 2 and thus transmit motion to the latter.

1 indicates that member of the coupling or clutch devices which is secured fast to the driven shaft. Its hub 19 is keyed to the driven shaft section 8 and carries an arm 20. The driving faces of the lateral, wedge-shaped projection 18 of the floating coupling member 2 are adapted to engage with the edge faces of the arm 20. The outer end of the hub 19 of the shaft-connected coupling member 1 is in engagement with a thrust bearing 25 provided therefor and carried by the casing 10. It will be seen that any force tending to move the shaft section 8 longitudinally outward is transmitted through the retaining washer 22, and the hubs of the several coupling members and the thrust bearing 25 to the casing 10 which is supported to resist any such lateral movement of the shaft. As already indicated, the parts thus far described are duplicated on opposite sides of the drive gear 6, a set of the coupling parts being arranged between such gear and each section of the driven shaft. The sets of coupling parts on the opposite sides of the main drive gear are preferably arranged diametrically opposite each other as indicated in Fig. 2 in order to balance the mechanism.

Let it be supposed that the main gear 6 is being driven in the direction indicated by the arrow $a$ in Fig. 2. The driving pieces 4 are carried by this gear, and the lateral projection 5 of each, in the course of its revolution, comes into engagement with one face 16 of a floating coupling member 3, and causes this latter to revolve with it. The laterally extending projection 14 of the floating coupling piece 3 in turn comes into engagement with the floating member 2 and causes revolution of the latter, while the lateral extension 18 of the member 2 comes into engagement with the arm 20 of the coupling piece fixed to the drive shaft and causes the rotation of the latter. Thus it will be seen that motion is imparted from part to part, beginning with the drive gear 6, and being transmitted successively through the driving piece 4, the floating coupling member 3, the second floating coupling member 2, and finally through the fixed arm or coupling member 1, to the driven shaft. The floating coupling member 2 is a duplication of the coupling member 3 and might be omitted without changing the principle of operation described; or the number of floating coupling members might be increased beyond two should circumstances indicate that this was desirable. Under ordinary conditions, as when a motor vehicle is being driven along a straight course, the parts of the transmission gear are in the positions indicated in Fig. 2, and both sections 8 of the driven shaft are turned together and at the same speed. Should, however, one of the shafts speed up, as would be the case with the shaft carrying the outer wheel when the vehicle is taking a curved course, then the fixed coupling member, 1, secured to the faster running section of the driven shaft moves ahead of the other parts of the coupling in the direction of the arrow $b$, Fig. 2, and is thus taken out of driving connection with the main gear 6; and hence the latter drives the vehicle only through the more slowly turning driven shaft section. With apparatus such as described one of the shaft sections can continue to run faster than the other for a considerable distance without coming into reverse coupling connection with the drive gear; for when the fixed coupling member, 1, begins to advance in the direction of the arrow $b$ it may make nearly a complete independent revolution before it comes into engagement with the projection 18 of the floating coupling member 2, on that side opposite to the one with which it was engaged when in driving relation and before the shaft section began to speed up; and when the fixed coupling member thus engages the floating coupling member 2, it picks up the latter and carries it away from engagement with the floating coupling member 3, and at the greater speed of the fast running shaft section, and nearly another complete revolution must be gained by the fast running shaft before the second floating coupling member 3 is picked up and carried ahead at the faster speed, and then nearly another complete revolution must be gained, making nearly three revolutions in all, before the parts are brought into reverse driving engagement with the driving piece 4 of the main gear 6. This amount of overrunning of the faster turning shaft would probably never occur in practice.

It is evident from an inspection of the drawings that the mechanism described is equally well adapted for reverse as for forward driving.

The shaping of the driving faces of the lateral projections 5, 14 and 18, and of the corresponding faces with which they engage, that is illustrated in the drawings, is that which I have found to be most advantageous under all circumstances, but departure from the lines indicated may be made without changing the invention.

It will be seen that the several members of the coupling or clutch connection between the driving shaft or member and the driven shaft or member comprise a set of revolving connections arranged in a laterally stepped relation to each other, each overlapping and engaging with the next in succession, and of which one or more of the intermediate connections are free to rotate independently of either the driving or the driven element, each intermediate connection being arranged to be driven by a preceding member of the series and to act as a driver for a succeeding member. It should also be recognized that each series of connections between the main gear and the driven shaft is of itself a complete organization, and under some conditions one of these might be used between the main gear and one driven shaft without an identical set of connections being used between the main gear and the other driven shaft. In other words, the invention is not restricted to the two driving connections being identical, so long as one of them is of the character herein described and defined in the claims.

I do not in this case claim the combination, in a transmission gearing, of a drive gear, a pair of driven members, and connections between the drive gear and the said driven members, including a projection carried by the drive gear, means fixedly connected with one of the driven members through which it is driven, and floating connections supported so as to be free to revolve about the axis of rotation of the driven member, disposed between the drive gear and the said driven member, which are arranged to be driven by the said projection carried by the drive gear and operate to drive, either directly or indirectly, the said driven member, and are free to rotate with the driven member and relative to the drive gear when the said driven member rotates at a speed greater than that at which the drive gear tends to rotate it, as such subject matter is presented and claimed in my copending application Serial No. 19,495, filed April 6, 1915.

What I claim is:—

1. In a transmission gearing, the combination of a drive gear, a pair of driven shafts and connections between the drive gear and the shafts, including a contact projection carried by one of the driven shafts, a projection carried by the driving gear, and a floating intermediate connecting member free to turn about the axis of rotation of the drive gear and arranged to be driven by the projection carried by the drive gear and to drive the said projection of the driven shaft.

2. In a transmission gearing, the combination of a drive gear, a pair of driven shafts and connections between the drive gear and the driven shafts, including a projection carried by one of the driven shafts, a projection carried by the drive gear, and a floating member intermediate between the main drive gear and the driven shaft, the drive gear, intermediate member and the driven shaft being all rotatable about the same axis of revolution and free to turn independently one of the other, and the intermediate floating member being arranged to be acted on by the contact projection of the drive gear and itself to act upon the projection fixed to the driven shaft.

3. In a transmission gearing for driving the more slowly turning of a pair of driven shafts, the combination of one of the driven shafts, a contact piece fixed to the shaft and through which it is driven, a floating member free to turn about the axis of revolution of the shaft, and a drive gear also free to turn about the said axis carrying a laterally extending projection, the lateral projection carried by the drive gear, the floating member, and the contact piece carried by the driven shaft, being in stepped relation to each other, each overlapping the next in succession.

4. In a transmission gearing, the combination with a drive gear and a pair of driven shafts, of connections between the said gear and shafts comprising a set of revolving connecting members between the gear and one of the shafts arranged in lateral stepped relation to each other, each overlapping and engaging with the next in succession, the intermediate members of the set of connections being free to rotate independently of either the driving or the driven elements, and each intermediate connection being arranged to be driven by a preceding member of the series and to act as a driver for a succeeding member.

5. In a transmission gearing, the combination of a driven shaft, a drive gear, these two rotating about the same axis but free to turn independently of each other, a contact piece carried by the drive gear, a contact piece carried by the driven shaft, these two being located in different planes of rotation, whereby they do not engage when one part rotates independently of the other, floating connections between the said contact pieces supported so as to turn freely about the same axis as that of the drive gear and driven shaft, the said floating connections being in the path of both the said driving and driven projections and serving as coupling means between them, a second driven shaft and driving connections between it and the drive gear.

6. In a transmission gearing, the combination of a driven shaft, a drive gear, projections fixed to each of these elements and through which they are connected, a plurality of intermediate connecting members located between the said driven and driving projections, each supported so as to be free to rotate independently, and said intermediate connecting members being in stepped lateral relation to each other, each overlapping and engaging with the next element in succession, a second driven shaft and driving connections between such shaft and the driven gear.

7. In a transmission gearing, the combination with a drive gear and a driven shaft rotatable independently of each other about the same axis of revolution, of a lateral wedge-shaped projection carried by the drive gear, an arm fixed to the driven shaft, and an intermediate floating connection supported so as to be free to rotate about the axis of revolution of the said drive gear and driven shaft and having an arm engaged by the wedge-shaped lateral extension of the drive gear and itself carrying a wedge-shaped lateral extension arranged to serve as a driver for the arm fixed to the driven shaft, a second driven shaft and driving connections between it and the said drive gear.

8. In a transmission gearing, the combination of a main drive gear, a pair of shafts to be driven thereby, projections extending laterally one from each side of the drive gear, projections carried respectively by the driven shafts, rotatable floating members interposed between the said drive gear and driven shafts and serving as intermediate coupling members between these, the said intermediate floating members carrying lateral driving projections and each set of driving members being arranged in lateral stepped relation to each other whereby either shaft is permitted to run ahead of the other one, which remains in driving connection with the drive gear.

9. In a transmission gearing, the combination of a main drive gear, a pair of shafts to be driven thereby, projections extending laterally one from each side of the drive gear, projections carried respectively by the driven shafts, a plurality of floating driving members between each projection carried by a driven shaft and the drive gear, the said floating members being supported by and free to rotate about the driven shafts and each provided with a lateral driving projection, which driving projections are in stepped lateral relation to each other, and a locking washer uniting one of these with the shaft on which it is supported.

CHRISTOPHER W. LEVALLEY.

Witnesses:
J. D. SARGENT,
G. J. GRASLE.

Copies of this patent may be obtained for five cents each, by addressing the "Commissioner of Patents, Washington, D. C."